United States Patent Office 2,836,586

Patented May 27, 1958

2,836,586

POLYBUTADIENE-CROTONIC ADDUCTS

Joachim Dazzi, Dayton, Ohio, assignor to Monsanto Chemical Company, St. Louis, Mo., a corporation of Delaware No Drawing. Application May 27, 1953
Serial No. 357,929

8 Claims. (Cl. 260—94.7)

This invention relates to high molecular weight adducts and more particularly provides linear polymeric compounds having a plurality of carboxylate radicals and a process for producing the same.

An object of the invention is the provision of new and useful polycarboxylates. Another object of the invention is the preparation of polycarboxylates from readily available polymeric materials. Still another object of the invention is the preparation of linear polycarboxylates from butadiene hydrocarbon polymers. A further object of the invention is to provide for the coatings, synthetic resins and plastics, plasticizer, rubber and textile industries a new class of polymeric materials having a high content of carboxylic radicals.

These and other objects of the invention hereinafter disclosed are provided by the following invention wherein there are prepared adducts of (1) a polymeric butadiene hydrocarbon with (2) a compound selected from the class consisting of crotonic anhydride, crotonic acid, and esters of crotonic acid having the formula $$CH_3CH:CHCOOR$$

in which R is selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 6 to 12 carbon atoms and aralkyl radicals of from 7 to 11 carbon atoms and the furfuryl and tetrahydrofurfuryl radicals, one mole of said anhydride, acid or ester being combined at each of at least 5 percent of the olefinic units of said polybutadiene.

Esters having the above formula and useful for the present purpose include the alkyl crotonates such as methyl, ethyl, isopropyl, n-propyl, n-butyl, tert-butyl, isoamyl, n-hexyl, n-heptyl or isooctyl crotonate; the alkoxyalkyl crotonates such as 2-methoxyethyl, 3-ethoxy-n-propyl or 4-butoxybutyl crotonate; the hydroxyalkyl esters such as 2-hydroxyethyl or 3-hydroxypropyl crotonate, the alicyclic esters such as cyclopropyl, cyclopentyl or cyclohexyl crotonate; the mercaptoalkyl esters such as 4-ethylmercaptobutyl crotonate; the aryl esters such as phenyl, β-naphthyl, or 2-xenyl crotonate; the aralkyl esters such as benzyl, or 2-phenylethyl crotonate; furfuryl or tetrahydrofurfuryl crotonate, etc.

Butadiene hydrocarbon polymers which add to crotonic anhydride, crotonic acid or the above crotonates are solid or normally liquid polymers of butadiene hydrocarbons such as 1,3-butadiene, isoprene, piperylene, dimethylbutadiene, 2-methylpentadiene, 2 - ethylhexadiene and the like. The presently useful polymers may also be polymers derived by copolymerization of two or more different butadiene hydrocarbons, e. g., from a mixture of butadiene and piperylene.

Reaction of the butadiene polymers with the crotonic compounds to form adducts takes place readily by heating the polymer with the acid, anhydride or ester in the presence or absence of an inert diluent or polymer solvent at ordinary or superatmospheric pressures. When operating at atmospheric pressure, temperatures of from, say, 160° C. to 300° C. and preferably of from 180° C. to 250° C. are used. An inhibitor of polymerization may be incorporated into the reaction mixture. The number of carboalkoxy groups introduced into the liquid polymer molecule depends upon the diene content of the polymer, upon the nature of the individual crotonic compound used, and upon the reaction conditions employed. Generally, operation within the higher temperature ranges, i. e., at temperatures of above, say, 180° C., under superatmospheric pressure, and below the decomposition point of any of the reactants leads to the introduction of more carboalkoxy groups than does operation at the lower temperatures. The use of superatmospheric pressure is advisable when working with the low boiling esters, i. e., with ethyl, butyl or amyl crotonate. The degree of carboalkoxylation also depends upon the individual crotonate employed. Usually, crotonic anhydride, crotonic acid or the lower alkyl esters are more reactive than either the higher alkyl or the higher alkoxyalkyl esters. In view of the effect of the reaction conditions and nature of the individual crotonic compound upon the extent of carboalkoxylation, it is recommended that for each initial run there be experimentally determined the operating conditions which should be observed for obtaining the desired degree of carboalkoxylation.

The quantity of crotonic compound present in the adduct will also depend upon its availability in the reaction mixture. Obviously, for the formation of adducts in which at least one mole of the crotonic compound has added to each olefinic unit of the liquid polymer, the calculated amount of the acid, anhydride or ester may be present in the reaction mixture.

The reaction may be effected in the presence or absence of an inert solvent or diluent. Particularly, when working with the liquid polymers, no extraneous solvent or diluent need be employed. However, with the solid polymers and, in some instances with the liquid polymers, it may be advantageous to work with a solution of the polymer in an inert, extraneous diluent or solvent, e. g., a liquid hydrocarbon or a liquid derivative thereof such as benzene, xylene, nitrobenzene or dichlorobenzene, a high-boiling aliphatic hydrocarbon such as kerosene, halogenated hydrocarbons such as chloroform or tetrachloroethane, etc. When working at atmospheric pressure, such diluent is generally removed before reaction of the polymer with the ester occurs, due to the high temperatures used.

When working with crotonic anhydride or crotonic acid, the adducts obtained have free anhydride or carboxy groups. These may be converted to salts or esters by treatment with inorganic bases or alcohols.

The contemplated use of the polybutadiene-crotonic adducts will determine the extent of carboxylation or carboalkoxylation desired. Adducts having a low proportion of carboalkoxy radicals are advantageously employed as adhesives, particularly as adhesives in bonding of cellulosic materials. Adducts having a higher proportion of carboalkoxy groups, on the other hand, are useful as synthetic resin plasticizers. Adducts having free anhydride or carboxy groups are useful for conversion into surface-active salts thereof.

That the polybutadiene-crotonate reaction products are adducts rather than blends of the polybutadiene and polymeric ester may be evidenced by hydrolysis of the reaction products to completely water-soluble materials. Thus, upon heating the adducts with aqueous alkali metal hydroxides or ammonia, they may be entirely converted to water-soluble salts. Treatment of the salts with dilute mineral acids yields the free polycarboxylic acids. The present invention thus provides not only the ester adducts, but also a new series of polycarboxylic acids and their alkali metal or ammonium salts.

The present invention is further illustrated, but not limited, by the following examples:

*Example 1*

To a 3-liter, stainless steel bomb there were charged 710 g. (5 moles) of butyl crotonate, 1 g. of hydroquinone and 108 g. (2 moles) of a liquid polybutadiene, a red-orange viscous material having a molecular weight of approximately 1500, analyzing 89.2% C, 11.19% H and having a viscosity of 880 centipoises at 50° C. as determined by the Brookfield method at a spindle rate of 1 R. P. M. The contents were heated under a nitrogen pressure of 200 p. s. i. for 10 hours at 200° C. The reaction mixture was then distilled at 25–30 mm. of Hg pressure to remove unreacted butyl crotonate and then heated at 1–2 mm. at an oil-bath temperature of 180° C. to give a total of 238.1 g. of unreacted butyl crotonate. There was thus obtained as residue 162 g. of the liquid polybutadiene-butyl crotonate adduct $n_D^{25}$ 1.5150 analyzing 83.50% C, 10.53% H and (by difference) 5.97% O. The composition of the residue thus corresponds to an adduct in which 108 g. of the polybutadiene is combined with 162 minus 108 or 54 g. of butyl crotonate. Based on the molecular weight of a butene unit as 54 and that of butyl crotonate as 142 in the present adduct 2 butene units have combined with 54/142 or 0.39 mole of butyl crotonate, i. e., the residue represents an adduct in which an average of 0.195 mole of butyl crotonate has combined with each olefinic unit of the original polymer. An adduct of this content has calculated values of 82.0% C and 10.6% H. These agree well with the experimentally determined values shown above.

*Example 2*

The liquid polybutadiene of Example 1 was reacted with crotonic anhydride as follows:

A mixture consisting of 231 g. (1.5 moles) of crotonic anhydride, 32.4 g. (0.6 mole of a butene unit) and 2.3 g. of tert-butylcatechol (as polymerization inhibitor) was charged to a 500 ml., 3-necked flask which was equipped with stirrer, thermometer and a Dean-Stark trap carrying a reflux condenser. The mixture was refluxed (212°–201° C.) at an oil bath temperature of 240–250° C. for 13 hours and then submitted to distillation at a pressure of 1 mm. of Hg and an oil bath temperature of 220° C. The residue (110 g.) changed to a brittle solid upon cooling. It was ground to a yellowish brown powder. Analysis of the powder gave 75.64% C, 8.18% H and (by difference) 16.18% O, indicating introduction of the anhydride oxygen into the polymer. Based on the weight increase, the powdered solid is an adduct in which 110 g. minus 32.4 g., or 77.6 g. of crotonic anhydride had added to 32.4 g. of the polymer. The present product is thus an adduct in which an average of 0.84 mole of crotonic anhydride was added to each repeated butene unit of the polybutadiene.

*Example 3*

Hydrolysis of the polybutadiene-crotonic anhydride adduct of Example 2 was accomplished by refluxing, for 3 hours 15 g. of the adduct in 200 g. of a solution of 4 g. of sodium hydroxide in 50% aqueous ethanol. Upon removal of the ethanol by concentrating the refluxed reaction mixture to a volume of 55 ml., there was obtained a clear, easily foaming, aqueous solution of the sodium salt of the hydrolyzed polybutadiene-crotonic anhydride adduct. Hydrolysis of the adduct as here shown to give the completely water-soluble sodium salt shows that addition, rather than polymerization had occurred in the reaction of Example 2.

What I claim is:

1. An adduct of (1) a polymer derived only from an aliphatic dienic hydrocarbon of from 4 to 8 carbon atoms with (2) a carboxy compound selected from the class consisting of crotonic anhydride, crotonic acid, and an ester of crotonic acid having the formula $$CH_3CH{:}CHCOOR$$

in which R is selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 4 to 14 carbon atoms and the furfuryl and tetrahydrofurfuryl radicals, one mole of said carboxy compound being combined at each of at least 5 percent of the olefinic units of said polymeric hydrocarbon, said adduct having been prepared by heating the polymer with the carboxy compound at a temperature of from 160° C. to 300° C.

2. An adduct of polybutadiene with an alkyl crotonate in which the alkyl radical has from 1 to 8 carbon atoms, one mole of said crotonate being combined at each of at least 5 percent of the olefinic units of said polybutadiene, said adduct having been prepared by heating the polybutadiene with the crotonate at a temperature of from 160° C. to 300° C.

3. An adduct of liquid polybutadiene with butyl crotonate, one mole of said crotonate being combined at each of at least 5 percent of the olefinic units of said polybutadiene, said adduct having been prepared by heating the polybutadiene with the crotonate at a temperature of from 160° C. to 300° C.

4. An adduct of liquid polybutadiene and crotonic anhydride, one mole of said anhydride being combined at each of at least 5 percent of the olefinic units of said polybutadiene, said adduct having been prepared by heating the polybutadiene with the anhydride at a temperature of from 160° C. to 300° C.

5. The process which comprises heating, at a temperature of from 160° C. to 300° C., a polymer derived only from an aliphatic dienic hydrocarbon of from 4 to 8 carbon atoms with a carboxy compound selected from the class consisting of crotonic anhydride, crotonic acid, and an ester of crotonic acid having the formula $$CH_3CH{:}CHCOOR$$

in which R is selected from the class consisting of alkyl radicals of from 1 to 8 carbon atoms, alkoxyalkyl radicals of from 2 to 8 carbon atoms, alkylmercaptoalkyl radicals of from 4 to 8 carbon atoms, alicyclic radicals of from 3 to 6 carbon atoms, aryl radicals of from 1 to 12 carbon atoms and aralkyl radicals of from 4 to 14 carbon atoms and the furfuryl and tetrahydrofurfuryl radicals, and recovering from the resulting reaction product an adduct in which one mole of said carboxy compound is combined at each of at least 5 percent of the olefinic units of said polymeric hydrocarbon.

6. The process which comprises heating, at a temperature of from 160° C. to 300° C., polybutadiene with an alkyl crotonate in which the alkyl radical has from 1 to 8 carbon atoms and recovering from the resulting reaction product an adduct in which one mole of said crotonate is combined at each of at least 5 percent of the olefinic units of said polybutadiene.

7. The process which comprises heating, at a temperature of from 160° C. to 300° C., a liquid polybutadiene with butyl crotonate and recovering from the resulting reaction product an adduct in which 1 mole of said crotonate is combined at each of at least 5 percent of the olefinic units of said polybutadiene.

8. The process which comprises heating, at a temperature of from 160° C. to 300° C., a liquid polybutadiene with crotonic anhydride and recovering from the resulting reaction product an adduct in which 1 mole of said anhydride is combined at each of at least 5 percent of the olefinic units of said polybutadiene.

References Cited in the file of this patent

UNITED STATES PATENTS 2,142,980 Huijser et al. ____________ Jan. 3, 1939